United States Patent [19]
Dolderer et al.

[11] Patent Number: 4,730,135
[45] Date of Patent: Mar. 8, 1988

[54] VEHICULAR-TYPE ALTERNATOR WITH CONTAMINATION-PROTECTED SLIP RINGS

[75] Inventors: Peter Dolderer, Oberstenfeld; Werner Lemke, Bietigheim-Bissingen; Stefan Renner, Weissach; Rüdiger Sohnle, Stuttgart; Kurt Flasche, deceased, late of Esslingen, by Irma Flasche, heiress; by Peter Flasche, heir, Ostfildern, all of Fed. Rep. of Germany

[73] Assignee: Robert Bosch GmbH, Stuttgart, Fed. Rep. of Germany

[21] Appl. No.: 901,761

[22] Filed: Aug. 28, 1986

[30] Foreign Application Priority Data

Sep. 17, 1985 [DE] Fed. Rep. of Germany ....... 3533115

[51] Int. Cl.$^4$ .......................... H02K 5/136; H02K 5/14
[52] U.S. Cl. .................... 310/68 D; 310/43; 310/232; 310/88
[58] Field of Search ............ 29/597; 310/42, 43, 310/68 D, 88, 89, 239, 90, 231, 232, 235

[56] References Cited

U.S. PATENT DOCUMENTS 3,233,130 2/1966 Bates ..................................... 310/88
3,638,055 1/1972 Zimmermann ....................... 310/43
3,731,126 5/1973 Hagenlocher et al. ............. 310/239
4,384,224 5/1983 Spitler et al. ......................... 310/43
4,476,410 10/1984 Wolcott ............................... 310/232
4,546,280 10/1985 Pflüger ............................. 310/68 D
4,680,495 7/1987 Chiampas et al. .................... 310/88

FOREIGN PATENT DOCUMENTS 1149856 4/1969 United Kingdom .

Primary Examiner—Patrick R. Salce
Assistant Examiner—D. L. Rebsch
Attorney, Agent, or Firm—Frishauf, Holtz, Goodman & Woodward

[57] ABSTRACT

To protect the space within which the slip rings (20a, 20 b) of a vehicular-type alternator operate, against extraneous contamination, a plastic sleeve (29) with an axially extending gap (35) is snap-connected with the inner wall defining an opening (28b) of a connection plate (23) already present in the alternator; this retains the sleeve (29), preferably of plastic, within the alternator, the other axial end thereof being secured to an internally extending projection from the B-end shield (15), either formed by a plastic bushing (19) surrounding the B-bearing (18) or an internal flange (36) already present on the end shield (15).

8 Claims, 5 Drawing Figures

VEHICULAR-TYPE ALTERNATOR WITH CONTAMINATION-PROTECTED SLIP RINGS

The present invention relates to dynamo electric machines, and more particularly to alternators especially intended for use in automotive vehicles, or other applications where the alternator is potentially exposed to weather and other environmental influences which cause contamination of the interior thereof.

BACKGROUND

Alternators, particularly intended for vehicular use, and especially adapted to be installed in automotive vehicles, are subjected to weather and environmental influences which are potentially harmful to the interior thereof. The alternator has slip rings which, usually, are exposed to an air stream induced in the alternator to provide for cooling thereof. The resultant contamination of the slip rings, and hence of the contacting surfaces with current supply brushes for a field winding, cause difficulties in the operation of the alternator. It is particularly damaging to the alternator if humidity and moisture, especially if salt-laden, due to road salting, operation near the seacoast or the like, reach the interior of the alternator. The slip rings and the brushes should be protected from spray or other moisture penetration as much as possible.

Alternators, as currently constructed and especially for vehicular use, are usually assembled in a pot or cap-like construction, such that two end shields or end bells are secured together, holding a stator winding and core therebetween. The alternator shaft is retained in bearings in the end shields. One side of the shaft penetrates from the alternator towards the outside thereof, and at that end carries a V-belt pulley for coupling via a V-belt to an internal combustion engine. Usually, a fan blade or fan wheel is located adjacent the pulley to pull air essentially axially through the alternator to provide for cooling thereof. No special protection against contamination, dirt, and particularly against spray water, is provided.

It has previously been proposed to provide protection for the interior elements of the alternator against contamination—see U.S. Pat. No. 3,233,130—in which housing elements are shaped to extend, cup-like, into the interior thereof, and to, at least in part, cover the slip rings. Such a construction is expensive to make, complex to assemble and requires additional structural elements in order to provide a reasonable sealing space within the region in which the slip rings operate.

It has also been proposed—see British Pat. No. 1,149,856—to provide a cup-shaped sheet-metal housing. This, however, is not an alternator which is adapted particularly for vehicular use, that is, it is constructed of the customary pot-shaped construction. The alternator, as described in the British patent, has a housing part fitted on the cup-shaped sheet-metal housing which retains a plate with rectifiers and the brush holder. A cup-shaped extension is connected to this housing part which partially covers the slip rings.

Covering the space in which the slip rings operates has also been suggested by utilizing a structural component made of insulating material which, in combination with a disk-like thickening of the rotor shaft, forms a space which is protected against dust and spray water, to some extent at least—see U.S. Pat. No. 3,731,126. This space, simultaneously, also encloses the brush holder and the brushes themselves, and it is closed over the housing portion at the slip ring side of the generator housing. A seal against the interior of the alternator is provided by use of a felt seal, in ring form, which engages the insulating element. This seal is subject to wear, and has to be serviced from time to time. An additional holding ring is needed to retain the structure in place.

THE INVENTION

It is an object to provide an arrangement which effectively inhibits penetration of spray water and contamination within an axially ventilated or air-cooled alternator, which is simple, does not require any changes in the construction of the alternator or components thereof, so that existing alternators can readily be modified for improved protection.

Briefly, the contamination protection utilizes an existing component within a standard automotive-type alternator, namely a transversely extending support plate which retains rectifier or connecting elements thereof. This support plate is formed with an opening through which the shaft of the rotor penetrates. In accordance with a feature of the present invention, a protective sleeve, with an axial slit defining an axial gap, is snapped around the slip rings and the shaft, and fitted in the opening in the support plate. The sleeve may be made of plastic, and initially so constructed that, upon minor compression, it can be snapped into the opening. The end portion of the sleeve, snapped into the opening of the support plate, can be formed with a small groove to provide for secure axial as well as radial attachment thereof. The other end of the sleeve can rest on already present shoulders of the end bell or end shield of the alternator, forming part of the housing, in which the brush-side bearing for the rotor shaft is located.

The construction has the advantage that, although an absolute encapsulation of the slip ring space is not provided, the slip rings are effectively protected against contamination from spray, or salt-laden moisture; the protection is inexpensive, easily applied and assembled in the alternator, and can be inserted in alternators which are already manufactured, without requiring major reassembly or modification of components. The slip ring space is not encapsulated in the sense that a dust-tight enclosure is provided; yet, for general vehicular-type service use, adequate protection for the slip rings is provided.

In accordance with a feature of the invention, the simple snap-in connection with the support plate forms a tight engagement, for both radial and axial seating of the slit sleeve over and around the slip rings. Thus, an opening in the plate, already provided, is utilized. The protective sleeve extends up to the next adjacent portion of the housing—namely the end shield, and the second covering and seating is obtained by engaging the end of the sleeve adjacent the housing with either a plastic sleeve which is already provided, in order to seat the bearing for the shaft in the housing, or a similar shoulder formed in the housing end shield or end bell, and also formed therein for positive seating of the bearing, typically a ball bearing.

DRAWINGS

DETAILED DESCRIPTION

Basically, the present invention is directed to covering of the region within which the slip rings operate by a sleeve-like shroud which is so constructed that no changes to the alternator structure need be made, the cover merely being snapped into position and held there by an interengaging projection-and-recess fit. The space in which the slip rings operate is thus effectively protected against external contamination without requiring alterations to the alternator structure itself.

Figure 3:
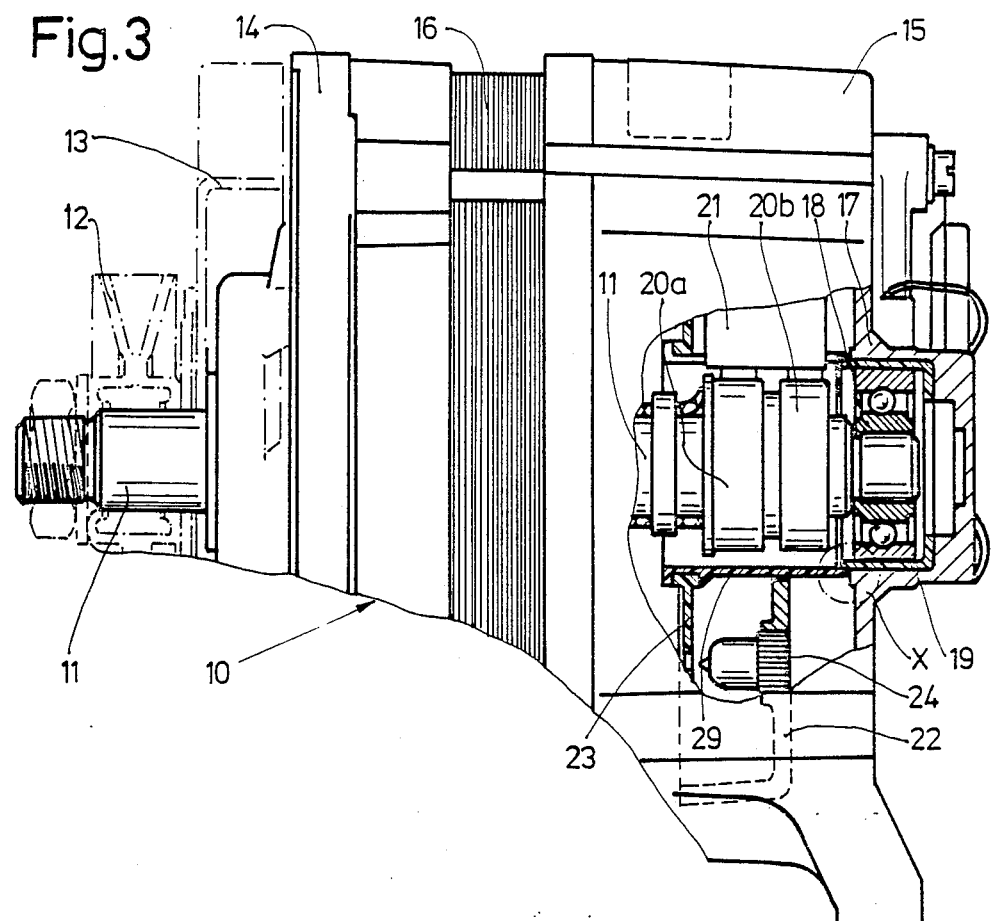
FIG. 3 is a highly schematic side view, partly broken away, of an automotive-type alternator, and illustrating the assembly of FIGS. 1 and 2 retained therein.

Referring first to FIG. 3: A three-phase alternator 10, typically of the type installed in automotive vehicles, is constructed as a claw-pole generator. It has a shaft 11 which is coupled to a V-belt pulley 12 to be driven by a V-belt from an automotive-type internal combustion engine (ICE). The engine itself is not shown; the entire construction, so far described, is well known and can be of any suitable type. Of course, any other drive arrangement may be used. Shaft 11, adjacent to the pulley 12, is coupled to a ventilator 13, usually made of stamped sheet metal. The housing of the alternator retains suitable bearings, preferably ball bearings, at alternate end portions of the shaft 11. The housing has a first end bell or end shield 14, adjacent the ventilator, and referred to as the A-end shield, and a second end bell or end shield 15, referred to as the B-end shield at the position of the shaft 11 remote from the pulley 12. A stator stack 16, with stator windings thereon, is positioned between the A and B end shields 14, 15, the stator laminations being clamped together and to the respective shields by suitable screws. The ball bearing 18 for the shaft 11 is seated in the B-shield 15 within an axial projection 17. The bearing 18 is held in centered position by an intermediate plastic bushing or sleeve 19. Two slip rings 20a, 20b are fitted on the shaft to supply power to a field winding on the rotor of the alternator—not further shown since it may be of any standard construction. Brushes are retained within a brush holder 21 to ride on the slip rings 20a, 20b.

Figure 1:
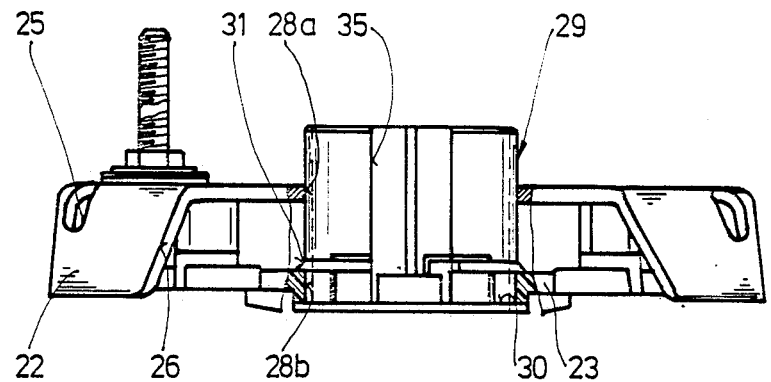
FIG. 1 is a side view, partly broken away and in section, of a rectifier assembly for an automotive-type alternator, which has the spray protecting sleeve attached thereto to form a complete subassembly.
Figure 2:
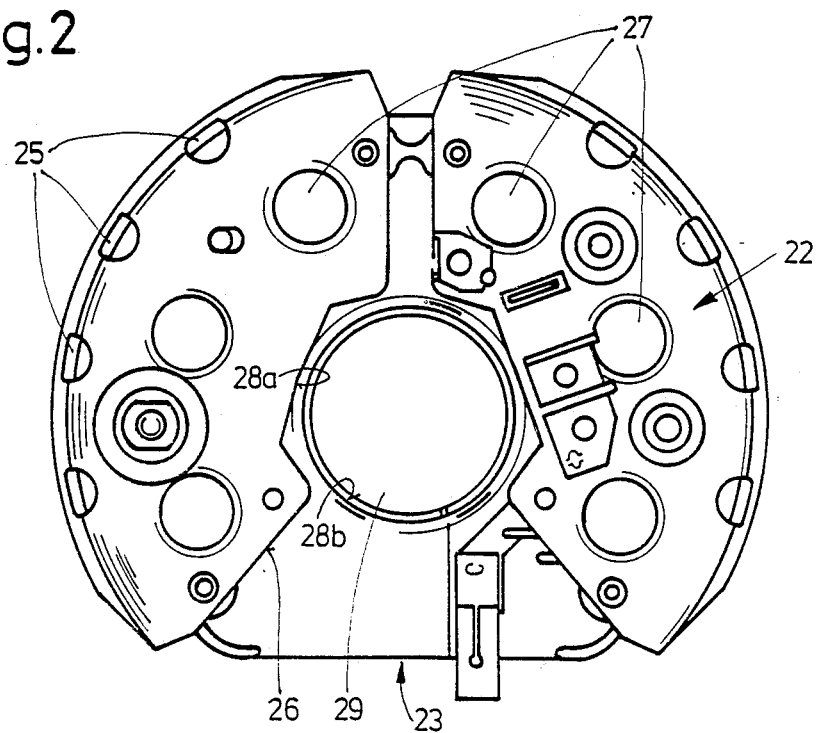
FIG. 2 is an end view of the assembly of FIG. 1, looked at from the top of FIG. 1.

The alternator is designed to provide direct current to charge the battery of a vehicle. A holding plate 22 for a rectifier assembly is located within the end shield 15. The end portion of the alternator further retains a connecting plate 23—seen only in fragmentary representation in FIG. 3. Rectifier diodes are press-fitted in suitable reception bores of the plate 22—one of them being illustrated at 24 in FIG. 3. The rectifier support plate 22 and the connecting plate 23 are supported on the B-shield 15 by bolts and spacer sleeves, in accordance with any suitable and well known construction. FIG. 1 shows that the support plate 22 for the rectifier diodes is angled over at the end portion thereof, to be essentially cup-shaped or dish-shaped. The corner region of the support plate 22 is formed with openings 25 to permit access to the interior of the rectifier support plate 22 for cooling air which, then, is pulled axially through the alternator by the ventilator blade 13, from the right towards the left with respect to FIG. 3. The support plate 22, further, is formed with an inwardly converging cut-out 26 to provide space for the brush holder and the brushes therein. The cut-out 26 extends up to the slip rings 20a, 20b. The entire arrangement of the support plate 22, the connecting plate 23, and the construction and electrical connection of the rectifiers 24 can be in accordance with well known and standard arrangements, and need not be described in detail. The rectifiers 24 are held in position in suitable cut-outs or bores 27 (FIG. 2) by press-fits and have connecting terminals which extend up to the connecting plate 23 where suitable wiring, for example in form of printed circuits or conductive tracks is provided to form the electrical connection for the rectifier assembly.

The rotor shaft extends centrally through the support plate 22 and the connecting plate 23. To permit the rotor shaft 11 to pass therethrough, support plate 23 is formed with a central opening or bore 28a. Connecting plate 23 is formed with a central opening or bore 28b. This is standard construction.

In accordance with a feature of the present invention, the already present central openings 28a, 28b (FIG. 1) are used for both axial and radial positioning of a protective sleeve 29—FIGS. 1 and 3—which is snap-connected in the respective bores. The sleeve 29, for example of plastic material, is fitted in the bore 28b of the connection plate 23 by an interengaging projection-and-snap-in-recess fit, and extends through the bore 28a of the support plate 22 and beyond the bore 28a up to the bearing 18, or to the B-bearing shield or end plate 15, respectively.

The sleeve 29 is coupled to the bore 28b in the connection plate 23 by slightly compressing the sleeve and then snapping the projecting bore wall within a circumferential groove 30 (FIG. 1) formed in the sleeve 29 at the inner end of the sleeve 29. It is only necessary to fit the sleeve 29 in the plane of the drawing of FIG. 1, from below, slightly compressing it and guiding it through the bores 28a, 28b, and then permitting the sleeve to resiliently expand and engage with the circumferential groove 30 in the edge of the wall of the opening 28b. The terminal end region of a small ridge formed adjacent the groove 30, preferably, is slightly tapered—as seen at 31 (FIG. 1)—which facilitates the snap-in connection. This is a preferred and simple way of engagement of the sleeve 29 although, of course, other arrangements are possible, for example to fit the sleeve 29 with suitable projections in correspondingly shaped recesses of the connection plate 23, with a circumferential twist to form a bayonet connection, the tight engagement being obtained by the circumferential rotation with a slight snap-in to fix the circumferential as well as the axial position of the sleeve.

Figure 3A:
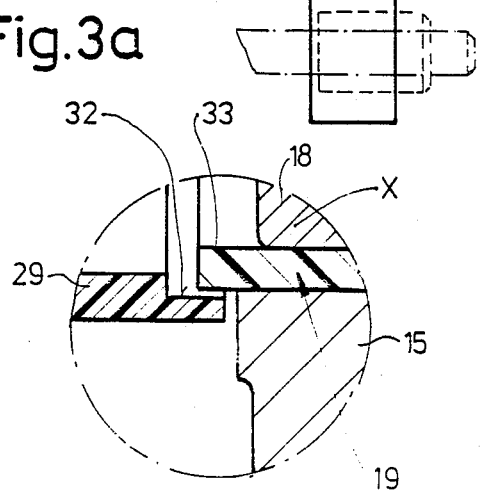
FIG. 3a is a greatly enlarged detail view of the area circled by the chain-dotted circle C of FIG. 3.

A second axial fitting of the sleeve 29 is formed by a projection of the end of the sleeve close to the bearing sleeve 19 of the bearing 18 fitted in the B-shield 15. FIG. 3 illustrates the arrangement, and shows—see the enlarged representation of FIG. 3a—that the plastic sleeve 19 extends axially inwardly beyond the end shield 15. The sleeve 29 is formed with a circumferential inner shoulder 32 which overlaps the projecting inner portion 33 of the sleeve 19. FIG. 3a clearly shows the arrangement—providing both for circumferential seating of the sleeve 39, as well as for axial positioning thereof. Slight clearance can be provided to permit thermal expansion. The shoulder region, of course, can be formed differently, for example by providing an inner extending ring which overlaps the end portion 33 of sleeve 19 from the radially inside region. In any event, a predetermined axial length of the sleeve 29 provides for an abutment end fit—possibly with slight clearance—against the B-shield 15, surrounding the end portion 33 from the outside or from the inside, to provide for reliable axial, as well as radial fitting of the sleeve 29 and a labyrinth-like sealing path with respect to contamination, thereby protecting the region of the slip rings 20a, 20b from external contamination. As best seen in FIG. 1, the sleeve 29 is formed with an axially extending slit 35 which permits access of the brushes within the brush holder 21 to the slip rings 20a, 20b. The slit or axial cut-out 35 may extend over the entire length of the sleeve, parallel to the axis of rotation, as seen in FIG. 1, or may form as enlarged cut-out just large enough to permit free passage of the brushes within the brush holder 21, with clearance for slight movement thereof, and narrowing around the end portions of the sleeve 29, where it is fitted in the connection plate 23 and around the end portion 33 of the plastic bushing 19.

Figure 4:
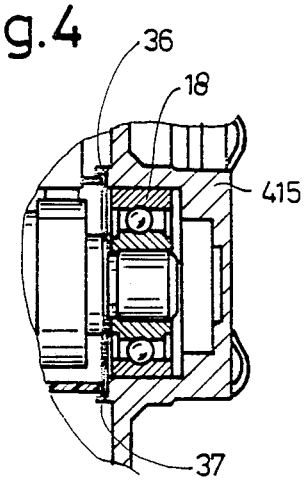
FIG. 4 illustrates a modified arrangement for axially securing the spray-protective sleeve in the region of the slip ring—end housing portion and bearing.

Various changes and modifications may be made; for example, the protective sleeve may be differently connected at the end shield 15, as illustrated in detail in FIG. 4. FIG. 4, which shows only the arrangement of seating of the sleeve, shows a construction without the plastic bushing or sleeve 19. The B-end shield 415, in this construction, is formed with a circumferential projecting flange 36. The sleeve 29 is snapped, from the inside, in the circumferential groove 37 defined by the flange 36; if necessary, the sleeve 29 can be formed with a radial shoulder, similar to the shoulder 32, but extending radially outwardly, or with a circumferential ridge to provide a secure axial, as well as circumferential fit within the groove 37 formed by the flange 36 on the end shield 415. Standard alternator constructions provide either for the flange 36 or for the bearing sleeve 19 so that, in either arrangement, no modification of the alternator is necessary.

The sleeve 29 can be retrofitted into existing alternators, for example upon mere disassembly of the end shield 15, 415, respectively, or assembled in newly constructed alternators, or in alternators being rebuilt without any modification of the standard alternator construction, and provides effective protection to the zone or region within which the slip rings operate.

We claim:

1. Vehicular-type alternator (10) with contamination-protected slip rings (20a, 20b),
    said alternator having a stator (14, 15, 16),
    a rectifier system (24) secured to the stator,
    a rotor and a rotor shaft (11),
    bearings (18) secured to the stator for rotatably retaining the rotor shaft,
    said slip rings (20a, 20b) being secured to the rotor shaft,
    a rectifier support plate (22) secured in the stator;
    a connection support plate (23) secured in the stator, axially spaced from said rectifier support plate,
    said support plates extending transversely to the shaft and being formed with openings (28a, 28b) to permit passage of the shaft (11) therethrough, said support plates supporting at least part of the rectifier system; and
    a brush holder (21) secured within the alternator and brushes located in the brush holder, in position for engagement with said slip rings,
    said alternator comprising, in accordance with the invention,
    a protective sleeve (29) formed with an axial gap (35) surrounding the slip rings (20a, 20b) and adjacent portions of the shaft (11), the axial gap (35) being located facing the brushes to permit passage of the brushes in the brush holder (21) past and through said sleeve for engagement with the slip rings, thereby obviating alteration of said brush holder,
    said protective sleeve being axially and radially secured in at least one of the openings (28b) of at least one of the support plates (22, 23) and being circumferentially fitted in the support plate; and
    wherein the sleeve (29) is formed with a groove extending at least in part circumferentially around the sleeve, said groove being engaged, in the portion of the support plate defining said opening, by a snap-in connection.

2. Vehicular-type alternator (10) with contamination-protected slip rings (20a, 20b),
    said alternator having a stator (14, 15, 16),
    a rectifier system (24) secured to the stator,
    a rotor and a rotor shaft (11),
    bearings (18) secured to the stator for rotatably retaining the rotor shaft,
    said slip rings (20a, 20b) being secured to the rotor shaft,
    a rectifier support plate (22) secured in the stator;
    a connection support plate (23) secured in the stator, axially spaced from said rectifier support plate,
    said support plates extending transversely to the shaft and being formed with openings (28a, 28b) to permit passage of the shaft (11) therethrough, said support plates supporting at least part of the rectifier system; and
    a brush holder (21) secured within the alternator and brushes located in the brush holder, in position for engagement with said slip rings,
    said alternator comprising, in accordance with the invention,
    a protective sleeve (29) formed with an axial gap (35) surrounding the slip rings (20a, 20b) and adjacent portions of the shaft (11), the axial gap (35) being located facing the brushes to permit passage of the brushes in the brush holder (21) past and through said sleeve for engagement with the slip rings, thereby obviating alteration of said brush holder,
    said protective sleeve being axially and radially secured in at least one of the openings (28b) of at least one of the support plates; and wherein
    the stator includes a B-end shield (15) retaining one of the bearings (18) centrally thereof;
    a bushing (19) is located between a portion of the end shield (15) and said bearing (18), said bushing extending axially beyond the bearing; and
    wherein the protective sleeve (29) circumferentially engages said bushing (19).

3. The alternator of claim 2, wherein said bushing is made of plastic material.

4. Vehicular-type alternator (10) with contamination-protected slip rings (20a, 20b),
    said alternator having a stator (14, 15, 16),
    a rectifier system (24) secured to the stator,
    a rotor and a rotor shaft (11),
    bearings (18) secured to the stator for rotatably retaining the rotor shaft,
    said slip rings (20a, 20b) being secured to the rotor shaft, a rectifier support plate (22) secured in the stator;

a connection support plate (23) secured in the stator, axially spaced from said rectifier support plate, said support plates extending transversely to the shaft and being formed with openings (28a, 28b) to permit passage of the shaft (11) therethrough, said support plates supporting at least part of the rectifier system; and a brush holder (21) secured within the alternator and brushes located in the brush holder, in position for engagement with said slip rings, said alternator comprising, in accordance with the invention, a protective sleeve (29) formed with an axial gap (35) surrounding the slip rings (20a, 20b) and adjacent portions of the shaft (11), the axial gap (35) being located facing the brushes to permit passage of the brushes in the brush holder (21) past and through said sleeve for engagement with the slip rings, thereby obviating alteration of said brush holder, said protective sleeve being axially and radially secured in at least one of the openings (28b) of at least one of the support plates (23); and wherein the stator includes a B-end shield (15), said B-end shield retaining one of the bearings (18) therein;

wherein the end shield is formed wtih a circumferential flange (36) projecting axially inwardly of the alternator beyond the bearing; and wherein the protective sleeve (29) circumferentially engages said projecting flange.

5. The alternator of claim 1, wherein the protective sleeve comprises plastic material.

6. The alternator of claim 1, wherein the protective sleeve (29) passes, with clearance, through the opening (28) formed in the support plate.

7. Vehicular-type alternator (10) with contamination-protected slip rings (20a, 20b), said alternator having a stator (14, 15, 16), a rectifier system (24) secured to the stator, a rotor and a rotor shaft (11), bearings (18) secured to the stator for rotatably retaining the rotor shaft, said slip rings (20a, 20b) being secured to the rotor shaft, a rectifier support plate (22) secured in the stator;

a connection support plate (23) secured in the stator, axially spaced from said rectifier support plate, said support plates extending transversely to the shaft and being formed with openings (28a, 28b) to permit passage of the shaft (11) therethrough, said support plates supporting at least part of the rectifier system; and a brush holder (21) secured within the alternator and brushes located in the brush holder, in position for engagement with said slip rings, said alternator comprising, in accordance with the invention, a protective sleeve (29) formed wtih an axial gap (35) surrounding the slip rings (20a, 20b) and adjacent portions of the shaft (11), the axial gap (35) being located facing the brushes to permit passage of the brushes in the brush holder (21) past and through said sleeve for engagement with the slip rings, thereby obviating alteration of said brush holder, said protective sleeve being axially and radially secured in at least one of the openings (28b) of at least one of the support plates (23); and wherein the protective sleeve (29) passes, with clearance, through the opening (28) formed in the support plate, wherein the protective sleeve is formed with a circumferential ridge at the region of securement within the opening (28) of said at least one support plate (22, 23), said ridge being formed with a circumferential groove (30) to form a snap-in connection with the portion of said support plate defining the opening (28).

8. The alternator of claim 7, wherein the protective sleeve (29) is formed of resilient plastic for resilient snap-in engagement with said opening (28b) in a connection plate (23);

and wherein the stator includes a B-end shield or end bell (15) having an axially inwardly extending circumferential projection (19, 33; 36) and the protective sleeve (29) is resiliently engaged with said inwardly axially extending projection.

* * * * *